(12) United States Patent
Kase

(10) Patent No.: US 7,388,584 B2
(45) Date of Patent: Jun. 17, 2008

(54) METHOD AND PROGRAM FOR DETERMINING INSIDES AND OUTSIDES OF BOUNDARIES

(75) Inventor: Kiwamu Kase, Wako (JP)

(73) Assignee: Riken, Saitama (JP)

( * ) Notice: Subject to any disclaimer, the term of this patent is extended or adjusted under 35 U.S.C. 154(b) by 400 days.

(21) Appl. No.: 10/507,623

(22) PCT Filed: May 15, 2003

(86) PCT No.: PCT/JP03/06053

§ 371 (c)(1),
(2), (4) Date: Sep. 14, 2004

(87) PCT Pub. No.: WO03/098489

PCT Pub. Date: Nov. 27, 2003

(65) Prior Publication Data

US 2005/0162418 A1    Jul. 28, 2005

(30) Foreign Application Priority Data

May 17, 2002    (JP)    ............................. 2002-142260

(51) Int. Cl.
*G06T 17/00*    (2006.01)
(52) U.S. Cl. ..................................... 345/424
(58) Field of Classification Search ................. 345/424
See application file for complete search history.

(56) References Cited

U.S. PATENT DOCUMENTS 5,166,876 A * 11/1992 Cline et al. ................. 345/424
5,345,490 A * 9/1994 Finnigan et al. ............ 378/4
5,458,125 A * 10/1995 Schweikard ................ 600/407
6,075,538 A * 6/2000 Shu et al. ................... 345/419

7,088,363 B2    8/2006 Kase et al.
2002/0135577 A1    9/2002 Kase et al.

FOREIGN PATENT DOCUMENTS

EP    1 229 463 A2    8/2002
EP    1 452 984 A1    9/2004

(Continued)

OTHER PUBLICATIONS

Tsunetaka Morimoto et al, "Recursive Subdivision Methods and Subspace Classification -The extension to Curves with Self-intersections and Overlaps-", Transactions of Information Processing Society of Japan, Dec. 15, 1996, vol. 37. No. 12, pp. 2223-2234.

(Continued)

*Primary Examiner*—Ulka Chauhan
*Assistant Examiner*—Dan Washburn
(74) *Attorney, Agent, or Firm*—Griffin & Szipl, P.C.

(57) ABSTRACT

A method for determining insides and outsides of boundaries includes an external data input step of inputting external data constituted by boundary data of objects, a cell division step of dividing the external data into rectangular parallelepiped cells having boundary planes orthogonal to each other, a cell classification step of classifying the cells into a boundary cell that includes the boundary data and a non-boundary cell that does not include the boundary data, and a space classification step of classifying the non-boundary cells into a plurality of spaces that are partitioned by the boundary cells.

17 Claims, 7 Drawing Sheets

FOREIGN PATENT DOCUMENTS

| | | |
|---|---|---|
| EP | 1 624 394 A1 | 2/2006 |
| JP | 08-096025 | 4/1996 |
| JP | 08-153214 | 6/1996 |
| JP | 09-081783 | 3/1997 |
| JP | 2002-230054 | 8/2002 |

OTHER PUBLICATIONS

Kazutoshi Yonekawa et al, "A Geometric Modeler by Using Spatial-Partitioning Representations", Transactions of Information Processing Society of Japan, Jan. 15, 1996, vol. 37, No. 1, pp. 60-69.

International Search Report, completed Jun. 10, 2003.

Kase, Kiwamu, et al., "Volume CAD-CW-complexes based approach," Computer Aided Design, vol. 37, Mar. 2005, pp. 1509-1520.

Kase, K. et al., "Volume CAD", Volume Graphics, pp. 145-173, 2003.

Lorensen, William E. et al., "Marching Cubes: A High Resolution 3D Surface Construction Algorithm", Computer Graphics, vol. 21, No. 4, Jul. 1987, pp. 163-169.

Bloomenthal, Jules et al., "Polygonization of Non-Manifold Implicit Surfaces," Computer Graphics Proceedings, Annual Conference Series, Aug. 6, 1995, pp. 309-316.

Kobori, Ken-Ichi et al., "Conversion of Spatial Partitioning Model into Boundary Representations," Vol. 49, No. 10, 1995, pp. 1230-1239.

Supplementary European Search Report issued in corresponding application No. EP 03 72 3379, completed Feb. 27, 2007 and mailed Mar. 6, 2007.

J. O'Rourke, "Computational Geometry in c Second Edition," Cambridge University Press, 1998, p. 246.

B. Curless and M. Levoy, "A volume tric method for building complex models from range images," In Proceedings of SIGGRAPH'96, 1996, pp. 303-312.

R. Szeliski, "Rapid Octree Construction from Image Sequences," Proceedings of International Conference on Recent Advances in 3-D Digital Modeling, May 1997, pp. 205-211.

K. Pulli et al., "Robust Meshes from Multiple Range Maps, " Proceedings of International Conference on Recent Advances in 3-D Digital Modeling, May 1997, pp. 205-211.

Rosenfeld & Kak (Japanese translation by Nagao), "Digital Image Processing," pp. 332-334 and 353-357, Dec. 10, 1978.

* cited by examiner

6 FACES

12 RIDGES

8 VERTEXES

INPUT DATA (PRESSING MOLD FOR AUTOMOBILE BUMPER)

EXPRESSION BY CELL AND ITS INSIDE (KTC) AS RESULT OF
CONVERSION BY VOXEL TYPE V-CAD

V-CAD DATA (ENLARGED VIEW)

SECTION (HAVING THICKNESS OF ONE VOXEL),
CIRCLES INDICATING DATA LACK

ROBUST EVEN WHEN HOLE AND DISCONNECTION EXIST

METHOD AND PROGRAM FOR DETERMINING INSIDES AND OUTSIDES OF BOUNDARIES

This is a National Phase Application in the United States of International Patent Application No. PCT/JP03/06053 filed May 15, 2003, which claims priority on Japanese Patent Application No. 142260/2002, filed May 17, 2002. The entire disclosures of the above patent applications are hereby incorporated by reference.

BACKGROUND OF THE INVENTION

1. Field of the Invention

The present invention relates to a method and a program for determining insides and outsides of two-dimensional or three-dimensional boundary surfaces.

2. Description of the Related Art

In the field of research and technique, a CAD (Computer Aided Design), a CAM (Computer Aided Manufacturing), a CAE (Computer Aided Engineering), a CAT (Computer Aided Testing), and the like are used as simulation means for designing, machining, analyzing, and testing, respectively.

In the case of the above conventional simulation means, a boundary surface of an object is important. For example, generally, the object is expressed by the boundary surface, and the inside of the boundary surface is uniformly treated. In such a case, it is necessary to use inside/outside determination method for determining the inside and the outside of the two-dimensional or three-dimensional boundary surface.

As a conventional inside/outside determination method, there is known (1) a ray crossing method, (2) a region growing (expanding) method that uses boundary tracking, (3) raster tracking in image processing, (4) multi-directional tracking, (5) a Curless method, (6) a Szeliski method and a Puli method that use oct-tree, Japanese Laid-Open Patent Publication Nos. 8-153214 and 9-81783, and so on.

(1) In the region growing method (the ray crossing method), when a boundary surface is input, the inside and the outside of an object is determined based on whether the number of intersecting points of the boundary with a light ray (having a trajectory of a half line) emitted from a certain point is even or odd. That is, when the number of the intersecting points is even, the light ray emitting point (the certain point) is outside the object, and when the number of the intersecting points is odd, the light emitting point is inside the object. This region growing (expanding) method is disclosed in "Computational geometry in C second edition" (J. O'Rourke, p. 246, Cambridge University Press, 1998).

However, the region growing (expanding) method cannot be applied to a case where the light ray accidentally comes in contact with the boundary surface because the number of intersecting points that should be two becomes one due to a repeated root. Further, the region growing method cannot be applied to a case where boundary information has a defect (data lack caused by a numerical value error or expression difference when reading data from different software by using CAD data).

(2) The region growing (expanding) method that uses boundary tracking in image processing when only boundary information is given is disclosed in "Digital Image Processing" (Rosenfeld & Kak, translator: Nagao, Kindaikagakusha, pp. 353-357), for example. However, since the processing is performed over an entire region, the processing takes time. Further, when the surface information has a defect, the outside/inside determination cannot be performed accurately.

(3) The raster tracking in image processing is disclosed in the above "Digital Image Processing" (p. 334), and is a method in which a boundary and a region sandwiched by the boundaries are tracked while scanning a cell along a coordinate axis such as an X axis. However, when a quantized image is formed from the boundary information having a defect, accurate inside/outside determination cannot be performed.

(4) In order to avoid this problem, the multi-directional tracking (disclosed in the above "Digital Image Processing", p. 332) can be used, but efficiency of this method is low.

(5) In the Curless method in the field of a reverse engineering (that restructures surface information from a group of measured points), external information such as a measured object and plural camera directions to regularly arranged measured points is used, and an implicit function based on a distance is defined in an entire field so that surface information can be restructured. This method is robust, and disclosed in "A volume tric method for building complex models from range images." (B. Curless and M. Levoy, In Proceedings of SIGGRAPH '96, pages 303-312, Aug. 1996).

However, in the Curless method, it is necessary to perform a calculation in a distance field for all cells, so that there is a demerit in terms of a data amount and a calculation time. Furthermore, an accuracy problem is pointed out. For example, a distance function cannot be accurately calculated in a structure thinner than a cell or at a sharp surface. This causes an error in the inside/outside determination.

(6) The Szeliski method and the Pulli method that use the oct-tree are also a method in which data is classified into the inside, the outside, and the boundary based on the relation between several obtained target range data (distance data) and cells divided from a space by the oct-tree to restructure the boundary. The Szeliski method is disclosed in "Rapid octree construction from image sequences" R. Szeliski., and the Pulli method is disclosed in "Robust meshes from multiple range maps" K. Pulli, T. Duchamp, H. Hoppe, J. McDonald, L. hapiro, W. Stuetzle. Proceedings of International Conference on Recent Advances in 3-D digital Imaging and Modeling, May 1997, pages 205-211. In these methods, a projection operation is performed for each cell, so that a process becomes complicated and takes time, and a calculation in the projection operation is unstable.

In "Method for generating three-dimensional orthogonal lattice data" of Japanese Laid-Open Patent Publication No. 8-153214, after a surface lattice and a vacant voxel are distinguished from each other, a reversing operation is performed to generate the surface lattice. This method can cope with up to two types of media, and it is difficult or impossible that this method is applied to three or more types of media.

In "Finite element model processing system and method for the same" of Japanese Laid-Open Patent Publication No. 9-81783, it is determined whether or not an area of a target division element matches a total area of triangles constituted by a target node and every two of vertexes of this division element. However, there is a problem in that this method cannot be applied to a case where the boundary information has a defect.

SUMMARY OF THE INVENTION

In order to solve the above problems, the present invention was made. It is an object of the present invention to provide a method for determining insides and outsides of boundaries, in which the method is robust against a defect of boundary information, inside/outside determination can be performed even when the boundary information has a defect, a processing speed is high, the implementation in a computing machine is easy, there is not a possibility that different spaces are classified into one space, and the method can be applied to multiple spaces.

According to the present invention, there is provided a method for determining insides and outsides of boundaries, comprising: an external data input step (A) of inputting external data (12) constituted by boundary data of objects; a cell division step (B) of dividing the external data into rectangular parallelepiped cells (13) having boundary planes orthogonal to each other; a cell classification step (C) of classifying the cells into a boundary cell (13a) that includes the boundary data and a non-boundary cell that does not include the boundary data; and a space classification step (D) of classifying the non-boundary cells (13b) into a plurality of spaces that are partitioned by the boundary cells (13a).

Further, according to the present invention, there is provided a program for determining insides and outsides of boundaries that is executed by a computing machine, comprising: an external data input step (A) of inputting external data (12) constituted by boundary data of objects; a cell division step (B) of dividing the external data into rectangular parallelepiped cells (13) having boundary planes orthogonal to each other; a cell classification step (C) of classifying the cells into a boundary cell (13a) that includes the boundary data and a non-boundary cell that does not include the boundary data; and a space classification step (D) of classifying the non-boundary cells (13b) into a plurality of spaces that are partitioned by the boundary cells (13a).

In the method and the program of the present invention, all the external data (12) is divided into the rectangular parallelepiped cells (13) having the boundary planes orthogonal to each other, and each of the cells is classified into the boundary cell (13a) or the non-boundary cell (13b). Accordingly, each cell is always classified into the boundary cell (13a) or the non-boundary cell (13b) even if the external data (12) has a defect in the boundary information.

Furthermore, since a size of the rectangular parallelepiped cell is large compared to the original boundary data, the cell that includes only a part of the boundary data (for example, one point) is made to be classified into the boundary cell (13a). Thereby, the boundary data is always included in the boundary cell (13a). In addition, even if the boundary data has a defect such as a data lack, as long as a size of the data lack is smaller than a size of the non-boundary cell (13b), the boundary data that includes a data lack is always included in the boundary cell (13a).

Thus, the method and the program of the present invention are robust against a defect of the boundary information so that the inside/outside determination can be performed even when the boundary information has a defect.

According to a preferred embodiment of the present invention, the space classification step (D) comprises: an initial setting step (D1) of initializing a space number k; a labeling step (D2) of successively scanning all of the cells to label the rectangular parallelepiped cells with the space number k; and a label modifying step (D3) of modifying the space numbers k of the labeled cells, the labeling step (D2) comprises: a step (E1) of labeling the currently scanned cell with the same space number as that of the immediately preceding cell when the immediately preceding cell and the currently scanned cell are the non-boundary cells; a step (E2) of labeling the currently scanned cell with the space number for the boundary cell when the currently scanned cell is the boundary cell; and a step (E3) of updating the space number k to be the space number k+1, and labeling the currently scanned cell with the updated space number k+1 when the immediately preceding cell is the boundary cell, and the currently scanned cell is the non-boundary cell, and the label modifying step (D3) comprises: a step (F1) of comparing the space numbers of the neighboring cells that neighbor one another; and a step (F2) of re-labeling the neighboring cells with the smallest of the compared space numbers.

In this method, by only performing one labeling step (D2) and one label modifying step (D3) on all of the rectangular parallelepiped cells (13), it is possible to classify all of the non-boundary cells (13b) into a plurality of spaces partitioned by the boundary cell (13a).

Accordingly, even when the number "n" of the cells is large, the processing time is an order of O(n), that is, proportional to the number "n". Thus, high speed processing can be realized.

Furthermore, a calculation procedure is simple, and creating of the program of the present invention and implementation of the present invention in a computing machine are easy.

In addition, since a plurality of spaces partitioned by the boundary cells (13a) are labeled with the different space numbers k, there is not a possibility that different spaces are classified into one space. Accordingly, the present invention can be applied to multiple spaces.

Preferably, at the cell division step (B), the external data is repeatedly divided into the cells by oct-tree division until cut points enough to reconstruct boundary shape elements that constitute boundary surfaces included in the external data are obtained. Preferably, at the cell division step (B), voxel data is divided into the rectangular parallelepiped cells (13) that have a same size.

By using the oct-tree division at the cell division step (B), the present invention can be applied to the V-CAD data. Further, by dividing the external data into the calls having the same size, the present invention can treat the usual voxel data.

In order to scan all the rectangular parallelepiped cells one after another, the labeling step (D2) is performed for three directions of X, Y and Z in turn, or is performed in a recursive manner.

In the case of the voxel data, the scanning is repeatedly performed for three directions of x, Y and Z in turn, and in the case of the V-CAD data, the scanning is performed in a recursive manner. Thereby, it is possible to scan the rectangular parallelepiped cells (13) one after another.

Preferably, the labeling step (D2) and the label modifying step (D3) are performed in turn per scanned cell, or after the labeling step (D2) is performed on all of the cells, the label modifying step (D3) is performed.

By performing the labeling step (D2) and the label modifying step (D3) in turn per scanned cell, it is possible to re-label the scanned cell with the smallest of the space numbers of the cells neighboring one another at an appropriate timing so that the maximum value of the space number can be made smaller.

Further, by performing the label modifying step (D3) after the labeling step (D2) is performed on all of the cells, it is possible to reduce the number of times the label modifying step (D3) is performed.

Other objects and advantageous features of the present invention will become apparent from the following description with reference to the attached drawings.

DESCRIPTION OF THE PREFERRED EMBODIMENTS

Figure 1:
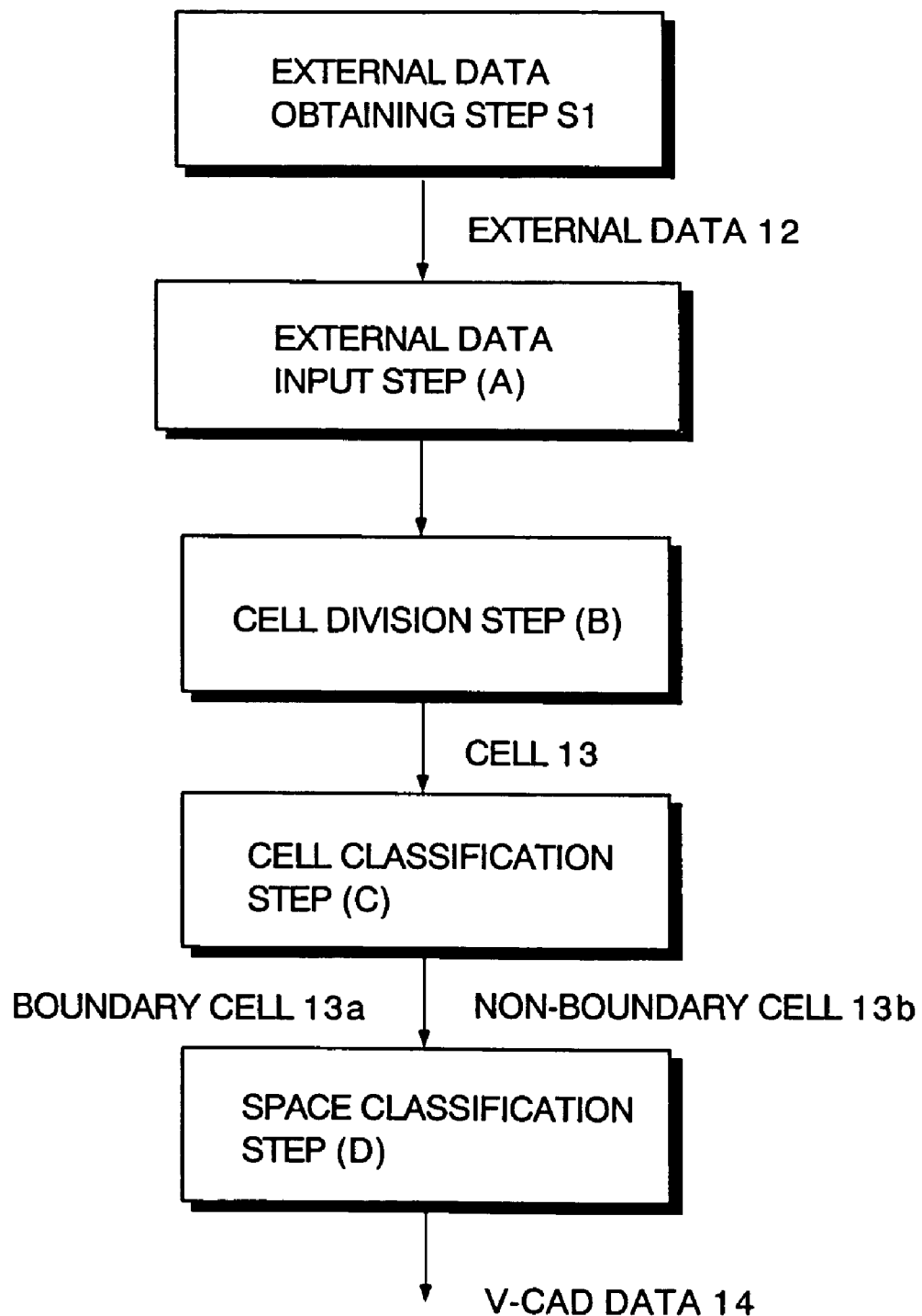
FIG. 1 is a flowchart of a method for determining insides and outsides of boundaries according to the present invention.

In the following, a preferred embodiment of the present invention will be described with reference to the drawings.

The inventor of the present invention made a preceding invention "Method for storing substantial data formed by integrating shape and physical property" and this invention was filed as Japanese Patent Application No. 2001-025023. According to this method, it is possible to store substantial data formed by unifying a shape and a physical property, with a small memory capacity. Thereby, it is possible to manage the shape, the structure, the physical property information, and the history of an object in an integrated fashion, and to manage data concerning a series of processes such as designing, machining, assembling, testing, and evaluating. Thus, the above method relates to a method for storing substantial data by which a CAD and a simulation can be integrated. The data of this method is referred to as "V-CAD data", and designing and simulation that uses this data is referred to as "volume CAD" or "V-CAD".

A method for determining insides and outsides of boundaries according to the present invention is particularly suitable to application to the V-CAD data. However, the present invention is not limited to this, and can be applied to a usual voxel data.

First, the terms in the present invention is mentioned.

The term "cell" refers to a region (such as a voxel and an octant of oct-tree) including the surface and the inside of a rectangular parallelepiped that is formed by dividing a three-dimensional space when boundary (surface) data is input. The term "non-boundary cell" (or "inner cell" in the Japanese Patent Application No. 2001-025023) refers to a cell that has no surface information.

It is assumed that a target three-dimensional space (referred to as "volume world" or simply "world") has a finite size. The world is occupied by two types of cell, i.e., the boundary cells and the non-boundary cells without clearance gap and without the insides of cells being overlapped, which is referred to as cell complex.

In other words, the boundary cell has an intersection point with input boundary data, in the inside constituting the boundary cell, or at the planes, the ridges or the vertexes that are the boundary of the boundary cell. The cell that does not have such an intersection point is the non-boundary cell. The cells that neighbor each other share only the cell boundary regardless of the types of the cells. An object that has two-dimensional manifolds as the boundary and that has a three-dimensional filled inside is referred to as "space". Respective spaces that are not combined are recognized as different spaces. Accordingly, the space indicates a part (a group of points) that is enclosed by a boundary (surface) expressed by a closed surface, and is used as a unit of an object having the same material in a real world. On the other hand, a boundary part that distinguishes the different spaces is referred to as "surface" or "boundary" (that has the same definition of a boundary in mathematics).

FIG. 1 is a flowchart of the method for determining insides and outsides of boundaries according to the present invention. As shown in FIG. 1, the method of the present invention includes an external data input step (A), a cell division step (B), a cell classification step (C), and a space classification step (D).

At the external data input step (A), external data 12 constituted by boundary data (data of plural boundaries) of objects 1 obtained at an external data obtaining step S1 is input to a computer or the like that stores the method (the program) of the present invention on a computer readable medium. At the cell division step (B), the external data 12 is divided into rectangular parallelepiped cells having boundary planes orthogonal to each other. The external data 12 may be divided into cubes, instead of rectangular parallelepiped cells 13.

At the cell classification step (C), each cell divided from the external data 12 is classified into a boundary cell 13$a$ that includes boundary data or a non-boundary cell 13$b$ that includes no boundary data. At the space classification step (D), the non-boundary cells 13$b$ are classified into a plurality of spaces partitioned by the boundary cells 13$a$.

When the method of the present invention is applied to V-CAD data, at the cell division step (B), the rectangular parallelepiped cells 13 are repeatedly divided by the oct-tree division until cut points enough to reconstruct boundary shape elements that constitute the boundary surfaces included in the external data are obtained.

Figure 2:
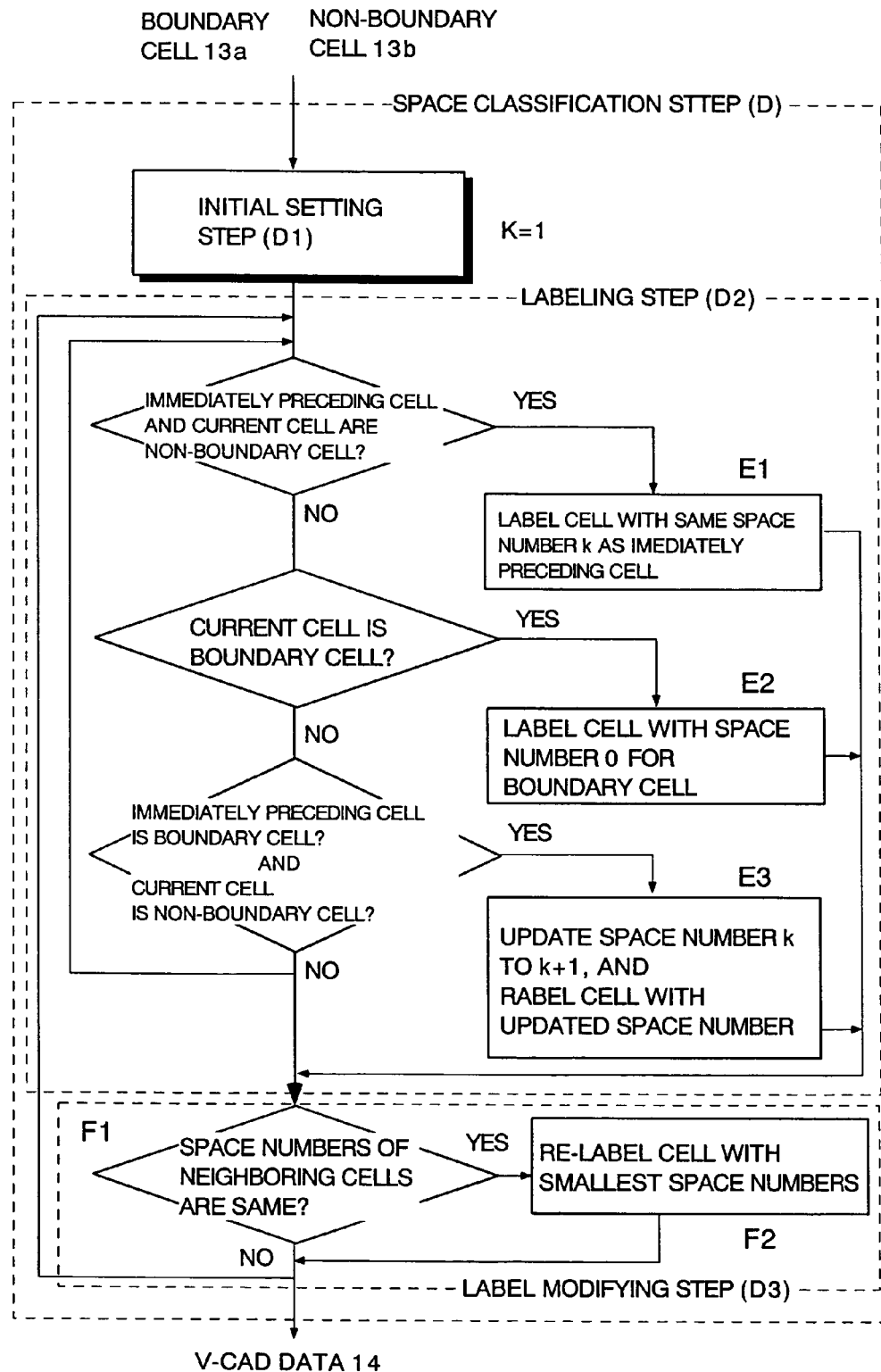
FIG. 2 is a flowchart of a space classification step (D) shown in FIG. 1.

FIG. 2 is a flowchart of the space classification step (D) of FIG. 1. As shown in FIG. 2, the space classification step (D) includes an initial setting step (D1), a labeling step (D2), and a label modifying step (D3).

At the initial setting step (D1), the space number k is initialized (k=1). At the labeling step (D2), all of the rectangular parallelepiped cells 13 are scanned one after another to label the rectangular parallelepiped cells 13 with the space numbers k. At the label modifying step (D3), the space numbers k attached to the rectangular parallelepiped cells 13 are modified.

In the case of application to usual voxel data, at the labeling step (D2), labeling is successively performed for three directions of X, Y and Z. In the case of application to V-CAD data, all of the rectangular parallelepiped cells 13 are scanned one after another by a recursive process.

In FIG. 2, the labeling step (D2) includes a step (E1), a step (E2) and a step (E3).

At the step (E1), when an immediately preceding cell and a currently scanned cell are non-boundary cells 13$b$, the currently scanned cell is labeled with the same space number as the space number of the immediately preceding cell. At the step (E2), when the scanned call is a boundary cell 13$a$, the scanned cell is labeled with the space number for the boundary cell. At the step (E3), when the immediately preceding cell is a boundary cell 13$a$, and the currently scanned cell is a non-boundary cell 13$b$, the space number k is updated to be the space number k+1, and the currently scanned cell is labeled with the updated space number.

In FIG. 2, the label modifying step (D3) includes a step (F1) of comparing the space numbers of the neighboring cells that neighbor one another, and a step (F2) of re-labeling all of the neighboring cells with the smallest of the compared space numbers.

The labeling step (D2) and the label modifying step (D3) may be performed in turn per scanned cell. Alternatively, after the labeling step (D2) is performed on all of the cells, the label modifying step (D3) may be performed.

Figure 3:
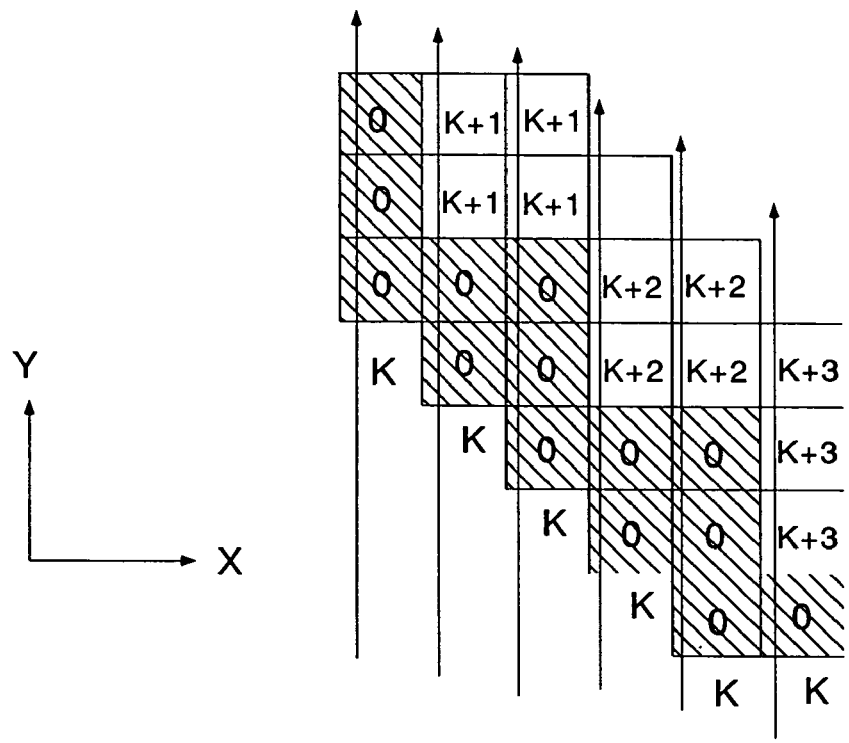
FIG. 3 schematically shows a labeling step (D2) in a two-dimension case.
Figure 4:
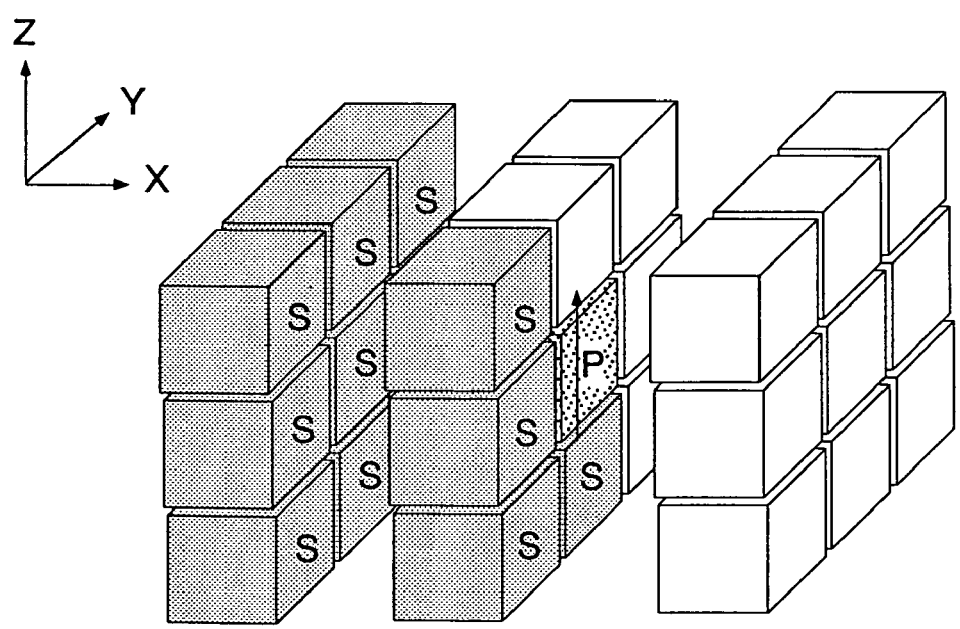
FIG. 4 schematically shows a labeling step (D2) in a three-dimension case.

FIG. 3 is a schematic view showing the labeling step (D2) in a two-dimension case, and FIG. 4 is a schematic view showing the labeling step (D2) in a three-dimension case. The method of the present invention will be described in further detail with reference to FIGS. 3 and 4.

The boundary information for the space, and the minimum resolution in dividing the world are required as input data. The boundary information that is partially lost as a result of conversion or calculation is allowable.

The external data 12 input from the outside is polygon data expressing polyhedrons, quadrihedron or hexahedrons elements used in a finite element method, curved surface data used in a three-dimensional CAD or a CG tool, or data that expresses surfaces of other three-dimensional shapes by using partial plane surfaces and partial curved surfaces.

Instead of such data, the external data 12 may be data generated directly by user's input by V-CAD's own interface, surface digitized data of a measuring device, a sensor, digitizer or the like, or volume data having internal information such as voxel data used in a CT scan, an MRI and general volume rendering.

Output data is V-CAD data 14 constituted by the boundaries of the two-dimensional manifolds, and constituted by cells having sizes no smaller than a size of the minimum resolution, and is data where the spaces have different space numbers. This V-CAD data has an entire space filled with cells (boundary cells) directly having the boundaries, and cells (non-boundary cells) having no boundaries.

In FIG. 2, "label" is used as the number (space number) for distinguishing the spaces. The cell type (boundary cell and non-boundary cell) is previously determined at the cell classification step (C). The cell type can be easily determined based on whether or not there is an intersection of the inside (as well as the boundary) of each cell with the input boundary information.

(1) At the initial setting step (D1), the space number k is set to be "1".

(2) The origin of coordinate axes in the volume world is always at a non-boundary cell, and the space k is designated. Preferably, the origin of the coordinate axes is at the vertex LDB (the left front side) in FIGS. 5A, 5B and 5C.

(3) In the case of the voxel data, a loop is executed for three directions of X, Y and Z (repeatedly in turn) to scan all of cells. In the case of the oct-tree, all of the cells are scanned by the recursive process (hierarchically deepened) in turn.

In FIG. 3, the arrows indicate the scanning direction, the hatching indicates boundary cells 13b, and the space numbers k of the cells are shown in respective cells. In FIG. 4, cells are separated from one another, the mark S indicates already scanned cells, and the mark P indicates the currently scanned cell.

(4) At the step (E1), until the currently scanned cell becomes a boundary cell, if there is a non-boundary cell 13b that neighbors the current cell and has been labeled, the current cell is labeled with the same space number as that of this neighboring and already labeled call.

At the step (E2), the space 0 (that indicates the boundaries) is set in the boundary cells.

At the step (E3), when the currently scanned cell becomes a non-boundary cell again, the space number k is updated to be the space number k+1, and the new space k (i.e., the updated space number) is set in the cells. In FIG. 3, the space number 0 is set in each boundary cell 13a, and the space numbers k, k+1, k+2, and k+3 are set in the non-boundary cells.

Figure 5A:
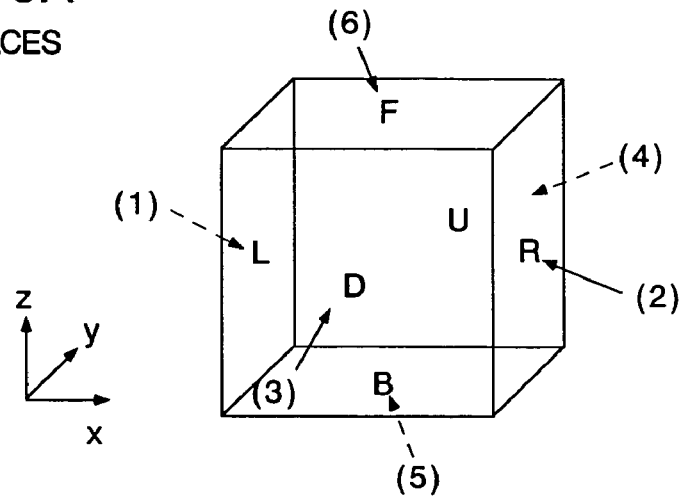
FIGS. 5A, 5B and 5C show parts of a cell that includes boundary data.
Figure 5B:
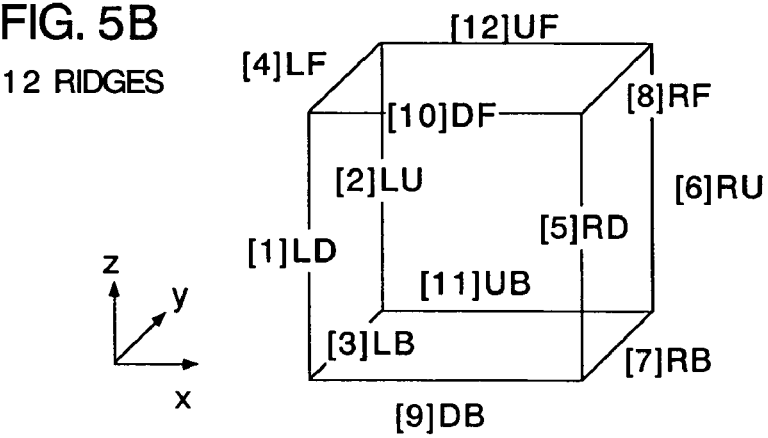
Figure 5C:
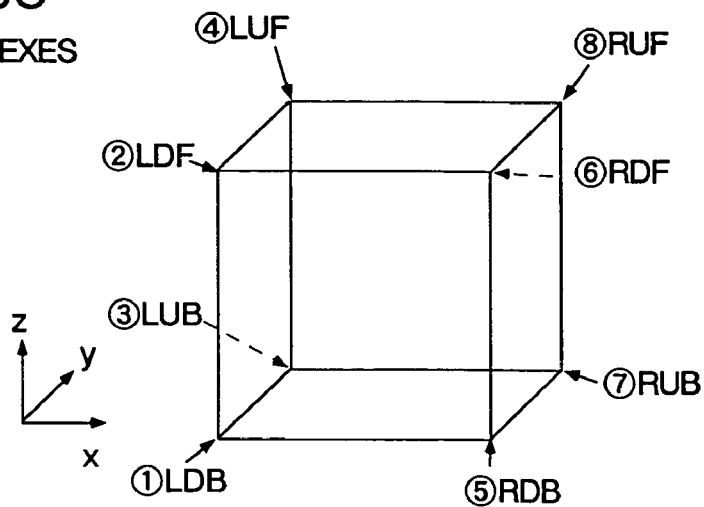

(5) When the labeling step (D2) and the label modifying step (D3) are performed in turn per scanned cell, As long as there is an already labeled cell that neighbors the currently scanned cell and has the label (assumed to be the space number j) different from the label (space number) of the currently scanned non-boundary cell, the current space number returns to the number j to re-label the current cell with the number j. In the case of the voxel, 13 neighboring cells (the half of 26 neighboring cells) of 9 neighboring cells at the side of L of FIGS. 5A, 5B and 5C, 3 neighboring cells at the side of D of FIGS. 5A, 5B and 5C, and one neighboring cell at the side of B of FIGS. 5A, 5B and 5C are known.

In the example of FIG. 3, the smallest of the space numbers k, k+1, k+2 and k+3 is used for re-labeling.

(6) Next, the above processes (3) through (5) are repeatedly performed to finish the processes. Otherwise, the current number k and the number j are added as a pair in a defect list.

(7) In the case where the label modifying step (D3) is performed after the labeling step (D2) is performed on all of the cells, all of the cells are scanned from the beginning. Then, when there is the cell included in the pairs of space numbers in the defect list, the cell is labeled with the smaller number to compress the space numbers.

According to the above-described method of the present invention, an entire range where neighboring vertexes, ridges and planes of only inner cells can be traced is determined as the same space in advance, and a range that is not completely surrounded by the boundary cells becomes the same space. Accordingly, the method of the present invention has the following features.

(1) Since the local processing suffices, the method of the present invention is robuster than the inside/outside determination that uses the region growing method. Further, even if there is a defect in the boundary information, the method of the present invention enables the inside/outside determination, so that the method of the present invention is robuster than the light ray crossing method that uses boundary information.

(2) A processing speed of the present invention (the processing time is the order of O(n) when the number of cells is "n") is higher than the region growing method that uses the boundary tracking of the image processing.

(3) The implementation is easy.

(4) Different spaces are note mixed.

(5) Since a region grows by using the local information until the region is enclosed by the boundary cells, the method of the present invention can also be applied to multiple spaces (multiple boundaries divide spaces).

EXAMPLE

Next, examples of the embodiment of the present invention will be described. FIGS. 6 through 11 show relatively complicated examples. Although the solid modeling is weak on the examples shown FIGS. 6 through 11, the inside/outside determination of the method of the present invention is robust on these examples.

Figure 6:
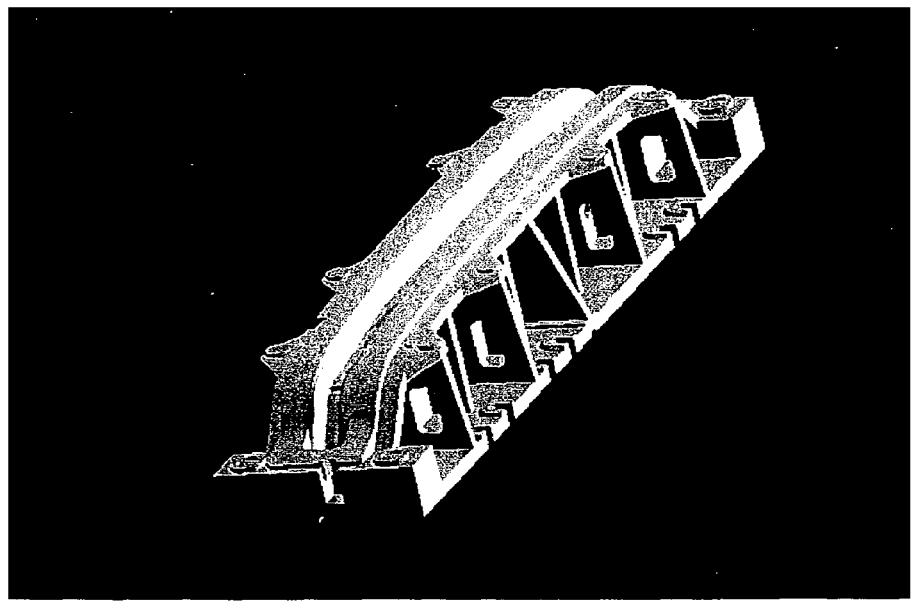
FIG. 6 shows a gradation image of input data displayed on a display.

FIG. 6 shows input data of a pressing mold for an automobile bumper in the form of a solid model.

Figure 7:
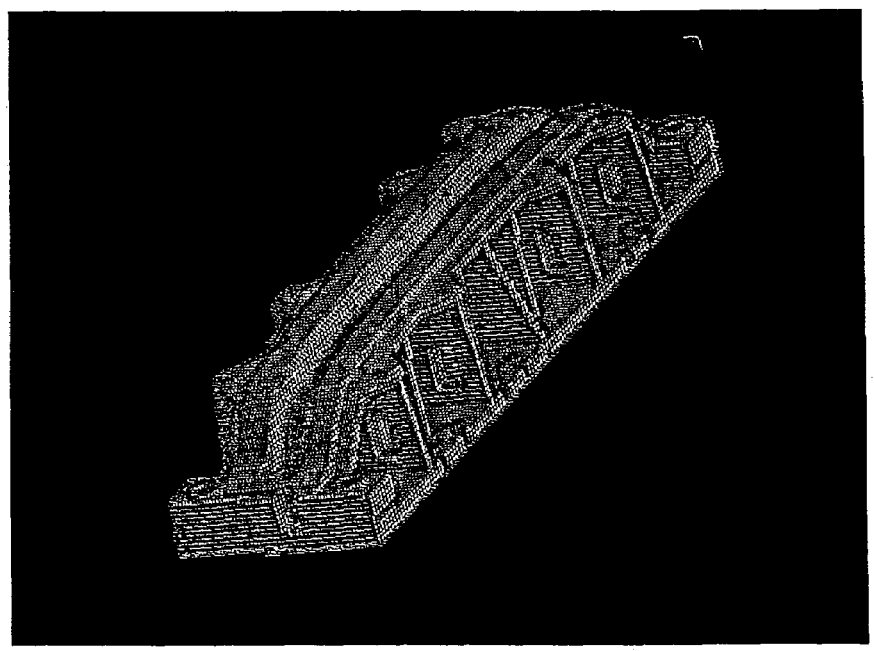
FIG. 7 shows a gradation image of boundary data and cells converted from the input data displayed on a display.

FIG. 7 shows cells and boundary data converted from the input data of FIG. 6.

Figure 8:
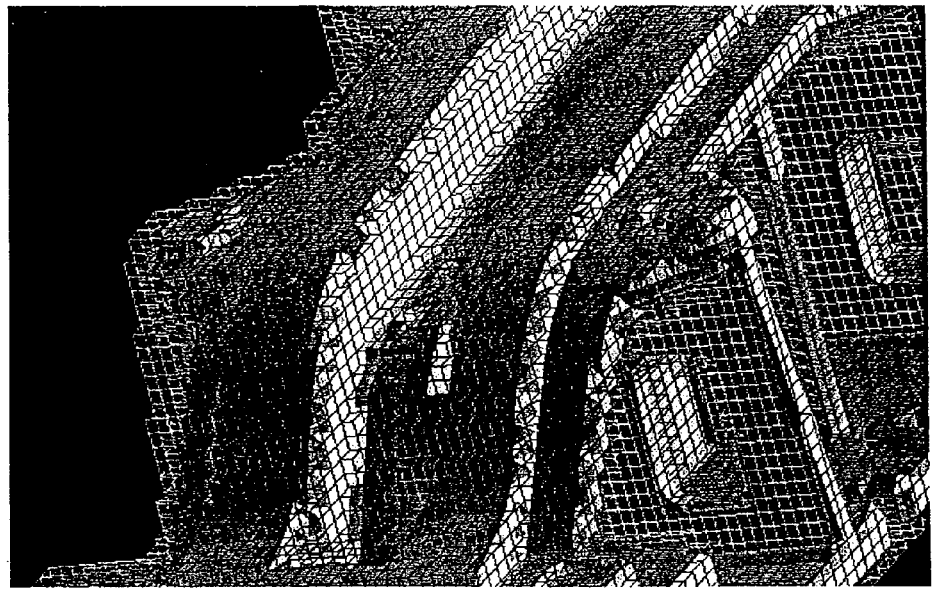
FIG. 8 shows a gradation image of boundary data and cells surrounded by thin lines displayed on a display.

FIG. 8 is a partial enlarged view of FIG. 7, and shows cells surrounded by thin lines as well as the boundary data.

Figure 9:
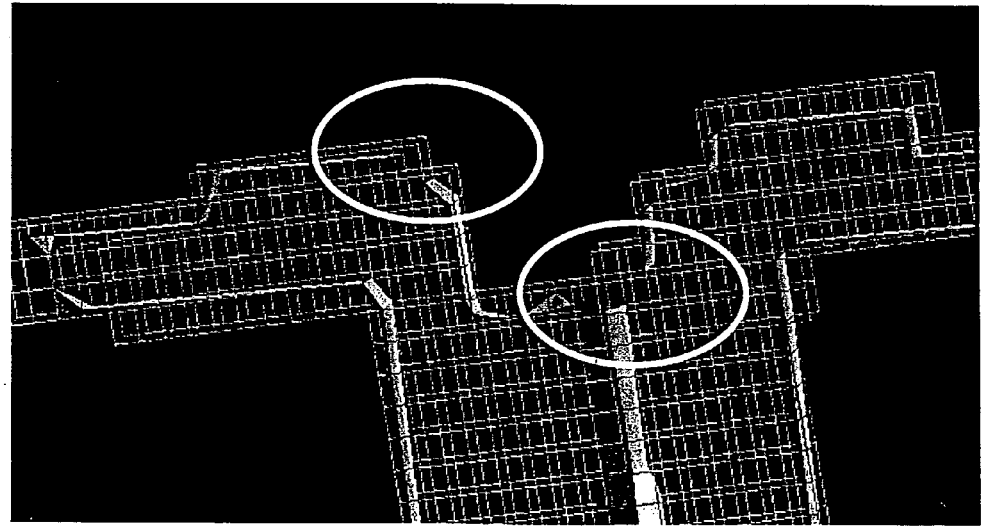
FIG. 9 shows a gradation image of data lack part of boundary data displayed on a display.

FIG. 9 partially shows a section of FIG. 7, and the ellipse marks indicate parts that lack boundary data. From FIG. 9, it is understood that the boundary cells can be recognized even if there is a relatively large lack of which size is close to a cell size.

Figure 10:
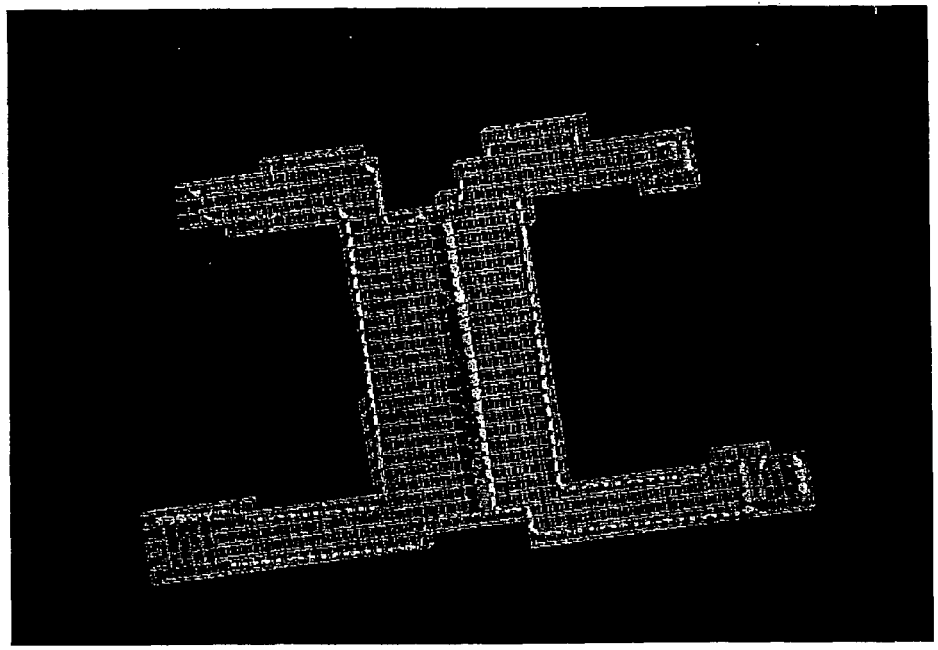
FIG. 10 shows a gradation image displayed on a display in which cut points are added to an entire configuration of FIG. 9.

FIG. 10 shows a configuration where cut points are added to the entire configuration of FIG. 9. In the present invention, at the cell classification step (C), the boundary cells that have cut points determined by the input data and ridges of the cells are set, and then, other cells (non-boundary cells) are labeled before the boundary cells so that the inside/outside determining process can become robuster.

Figure 11:
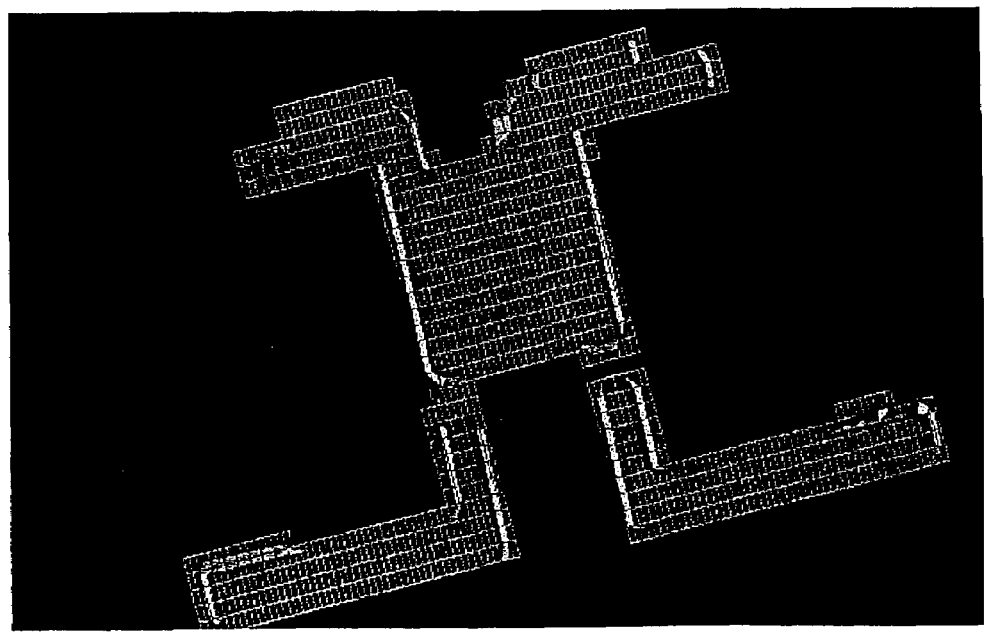
FIG. 11 shows a gradation image of a section that has a hole and is similar to but different from a section shown in FIG. 10.

FIG. 11 shows another section similar to that of FIG. 10, and shows that the processing by the method of the present invention is robust even when there are a hole and a disconnection.

According to the above-described present invention, at the cell division step (B), all the external data 12 is divided into rectangular parallelepiped cells 13 of which boundary planes are orthogonal to each other, and at the cell classification step (C), respective cells divided from the external data 12 are classified into the boundary cell 13a and the non-boundary cell 13b. Accordingly, even if defect boundary data exists in the external data 12, the cells are always classified into the boundary cell 13a and the non-boundary cell 13b.

Further, since the rectangular parallelepiped cell 13 is large compared to the original boundary data, the cell that includes only a part of boundary data (for example, one point) is set to be a boundary cell 13a so that the boundary data can always be included in the boundary cells 13a. Furthermore, even when the boundary information has a defect such as a data lack, as long as a size of the data lack is smaller than a size of the non-boundary cell 13, the boundary data that includes the data lack can also be included in the boundary cells 13a.

Thus, the present invention has the following advantages. The method and program of the present invention are robust against a defect of the boundary information, so that the inside/outside determination can be performed even when the boundary information has a defect. Further, according to the method and program of the present invention, a processing speed is high, the implementation of the present invention in a computing machine is easy, there is a low possibility that different spaces are classified into the same space, and the present invention can be applied to a multiple space.

In the above, several examples of the embodiment of the present invention are described. However, it will be understood that a scope of the present invention is not limited to the above-described examples. In other words, the scope of the present invention includes all of improvements, modifications and equivalents within a scope of claims of the present invention.

What is claimed is:

1. A method for determining insides and outsides of boundaries, comprising:
    an external data input step (A) of inputting external data constituted by boundary data of objects;
    a cell division step (B) of dividing the external data into rectangular parallelepiped cells having boundary planes orthogonal to each other;
    a cell classification step (C) of classifying the cells into a boundary cell that includes the boundary data and a non-boundary cell that does not include the boundary data;
    a space classification step (D) of classifying the non-boundary cells into a plurality of spaces that are partitioned by the boundary cells, wherein the space classification step (D) comprises:
        an initial setting step (D1) of initializing a space number k;
        a labeling step (D2) of successively scanning all of the cells to label the rectangular parallelepiped cells with the space number k; and
        a label modifying step (D3) of modifying the space numbers k of the labeled cells; and
    outputting to an output device output data of either the cell classification step (C), the space classification step (D), or both, wherein the labeling step (D2) comprises:
        a step (E1) of labeling the currently scanned cell with the same space number as that of the immediately preceding cell when the immediately preceding cell and the currently scanned cell are the non-boundary cells;
        a step (E2) of labeling the currently scanned cell with the space number for the boundary cell when the currently scanned cell is the boundary cell; and
        a step (E3) of updating the space number k to be the space number k+1, and labeling the currently scanned cell with the updated space number k+1 when the immediately preceding cell is the boundary cell, and the currently scanned cell is the non-boundary cell, and
    the label modifying step (D3) comprises:
        a step (F1) of comparing the space numbers of the neighboring cells that neighbor one another; and
        a step (F2) of re-labeling the neighboring cells with the smallest of the compared space numbers, and wherein in order to scan all the rectangular parallelepiped cells one after another, the labeling step (D2) is performed for three directions of X, Y and Z in turn, or is performed in a recursive manner.

2. The method for determining insides and outsides of boundaries according to claim 1, wherein at the cell division step (B), the external data is repeatedly divided into the cells by oct-tree division until cut points enough to reconstruct boundary shape elements that constitute boundary surfaces included in the external data are obtained.

3. The method for determining insides and outsides of boundaries according to claim 1, wherein at the cell division step (B), voxel data is divided into the rectangular parallelepiped cells that have a same size.

4. The method for determining insides and outsides of boundaries according to claim 1, wherein the labeling step (D2) and the label modifying step (D3) are performed in turn per scanned cell, or after the labeling step (D2) is performed on all of the cells, the label modifying step (D3) is performed.

5. The method for determining insides and outsides of boundaries according to claim 1, wherein the output device comprises a display and the output data is displayed on the display.

6. A computer encoded with a computer program for determining insides and outsides of boundaries, wherein the computer program causes a computing machine to execute the following steps:
    an external data input step (A) of inputting external data constituted by boundary data of objects;
    a cell division step (B) of dividing the external data into rectangular parallelepiped cells having boundary planes orthogonal to each other;

a cell classification step (C) of classifying the cells into a boundary cell that includes the boundary data and a non-boundary cell that does not include the boundary data;

a space classification step (D) of classifying the non-boundary cells into a plurality of spaces that are partitioned by the boundary cells, wherein the space classification step (D) comprises:

an initial setting step (D1) of initializing a space number k;

a labeling step (D2) of successively scanning all of the cells to label the rectangular parallelepiped cells with the space number k; and a label modifying step (D3) of modifying the space numbers k of the labeled cells; and outputting to an output device output data of either the cell classification step (C), the space classification step (D), or both, wherein the labeling step (D2) comprises:

a step (E1) of labeling the currently scanned cell with the same space number as that of the immediately preceding cell when the immediately preceding cell and the currently scanned cell are the non-boundary cells;

a step (E2) of labeling the currently scanned cell with the space number for the boundary cell when the currently scanned cell is the boundary cell; and a step (E3) of updating the space number k to be the space number k+1, and labeling the currently scanned cell with the updated space number k+1 when the immediately preceding cell is the boundary cell, and the currently scanned cell is the non-boundary cell, and the label modifying step (D3) comprises:

a step (F1) of comparing the space numbers of the neighboring cells that neighbor one another; and a step (F2) of re-labeling the neighboring cells with the smallest of the compared space numbers, and wherein in order to scan all the rectangular parallelepiped cells one after another, the labeling step (D2) is performed for three directions of X, Y and Z in turn, or is performed in a recursive manner.

7. The method for determining insides and outsides of boundaries according to claim 6, wherein the output device comprises a display and the output data is displayed on the display.

8. A method for determining insides and outsides of boundaries, comprising the steps of:
(A) inputting external data constituted by boundary data of objects;
(B) dividing the external data into rectangular parallelepiped cells having boundary planes orthogonal to each other;
(C) classifying the cells into a boundary cell that includes the boundary data and a non-boundary cell that does not include the boundary data;
(D) classifying the non-boundary cells into a plurality of spaces that are partitioned by the boundary cells, wherein step (D) comprises the steps of:
  i. initializing a space number k;
  ii. successively scanning all of the cells to label the rectangular parallelepiped cells with the space number k; and
  iii. modifying the space numbers k of the labeled cells; and
(E) outputting to an output device output data of either step (C), step (D), or both, wherein step (ii) comprises the steps of:
  labeling the currently scanned cell with the same space number as that of the immediately preceding cell when the immediately preceding cell and the currently scanned cell are the non-boundary cells;
  labeling the currently scanned cell with the space number for the boundary cell when the currently scanned cell is the boundary cell; and
  updating the space number k to be the space number k+1, and labeling the currently scanned cell with the updated space number k+1 when the immediately preceding cell is the boundary cell, and the currently scanned cell is the non-boundary cell, and
step (iii) comprises the steps of:
  comparing the space numbers of the neighboring cells that neighbor one another; and
  re-labeling the neighboring cells with the smallest of the compared space numbers.

9. The method for determining insides and outsides of boundaries according to claim 8, wherein the output device comprises a display and the output data is displayed on the display.

10. The method for determining insides and outsides of boundaries according to claim 8, wherein at step (B), the external data is repeatedly divided into the cells by oct-tree division until cut points enough to reconstruct boundary shape elements that constitute boundary surfaces included in the external data are obtained.

11. The method for determining insides and outsides of boundaries according to claim 8, wherein at step (B), voxel data is divided into the rectangular parallelepiped cells that have a same size.

12. The method for determining insides and outsides of boundaries according to claim 8, wherein step (ii) and step (iii) are performed in turn per scanned cell, or after the step (ii) is performed on all of the cells, the step (iii) is performed.

13. A computer encoded with a computer program for determining insides and outsides of boundaries, wherein the computer program causes a computing machine to execute the steps of:
(A) inputting external data constituted by boundary data of objects;
(B) dividing the external data into rectangular parallelepiped cells having boundary planes orthogonal to each other;
(C) classifying the cells into a boundary cell that includes the boundary data and a non-boundary cell that does not include the boundary data;
(D) classifying the non-boundary cells into a plurality of spaces that are partitioned by the boundary cells, wherein step (D) comprises the steps of:
  i. initializing a space number k;
  ii. successively scanning all of the cells to label the rectangular parallelepiped cells with the space number k; and
  iii. modifying the space numbers k of the labeled cells; and
(E) outputting to an output device output data of either step (C), the step (D), or both, wherein step (ii) comprises the steps of:
  labeling the currently scanned cell with the same space number as that of the immediately preceding cell when the immediately preceding cell and the currently scanned cell are the non-boundary cells;
  labeling the currently scanned cell with the space number for the boundary cell when the currently scanned cell is the boundary cell; and updating the space number k to be the space number k+1, and labeling the currently scanned cell with the updated space number k+1 when the immediately preceding cell is the boundary cell, and the currently scanned cell is the non-boundary cell, and step (iii) comprises the steps of:
  comparing the space numbers of the neighboring cells that neighbor one another; and
  re-labeling the neighboring cells with the smallest of the compared space numbers.

14. The computer encoded with a computer program for determining insides and outsides of boundaries according to claim 13, wherein the output device comprises a display and the output data is displayed on the display.

15. The computer encoded with a computer program for determining insides and outsides of boundaries according to claim 13, wherein at step (B), the external data is repeatedly divided into the cells by oct-tree division until cut points enough to reconstruct boundary shape elements that constitute boundary surfaces included in the external data are obtained.

16. The computer encoded with a computer program for determining insides and outsides of boundaries according to claim 13, wherein at step (B), voxel data is divided into the rectangular parallelepiped cells that have a same size.

17. The computer encoded with a computer program for determining insides and outsides of boundaries according to claim 13, wherein step (ii) and step (iii) are performed in turn per scanned cell, or after the step (ii) is performed on all of the cells, the step (iii) is performed.

* * * * *